No. 693,990. Patented Feb. 25, 1902.
M. ARNDT.
APPARATUS FOR MEASURING AND RECORDING OSCILLATING MOVEMENTS OF BODIES.
(Application filed Dec. 10, 1898.)
(No Model.) 2 Sheets—Sheet 1.
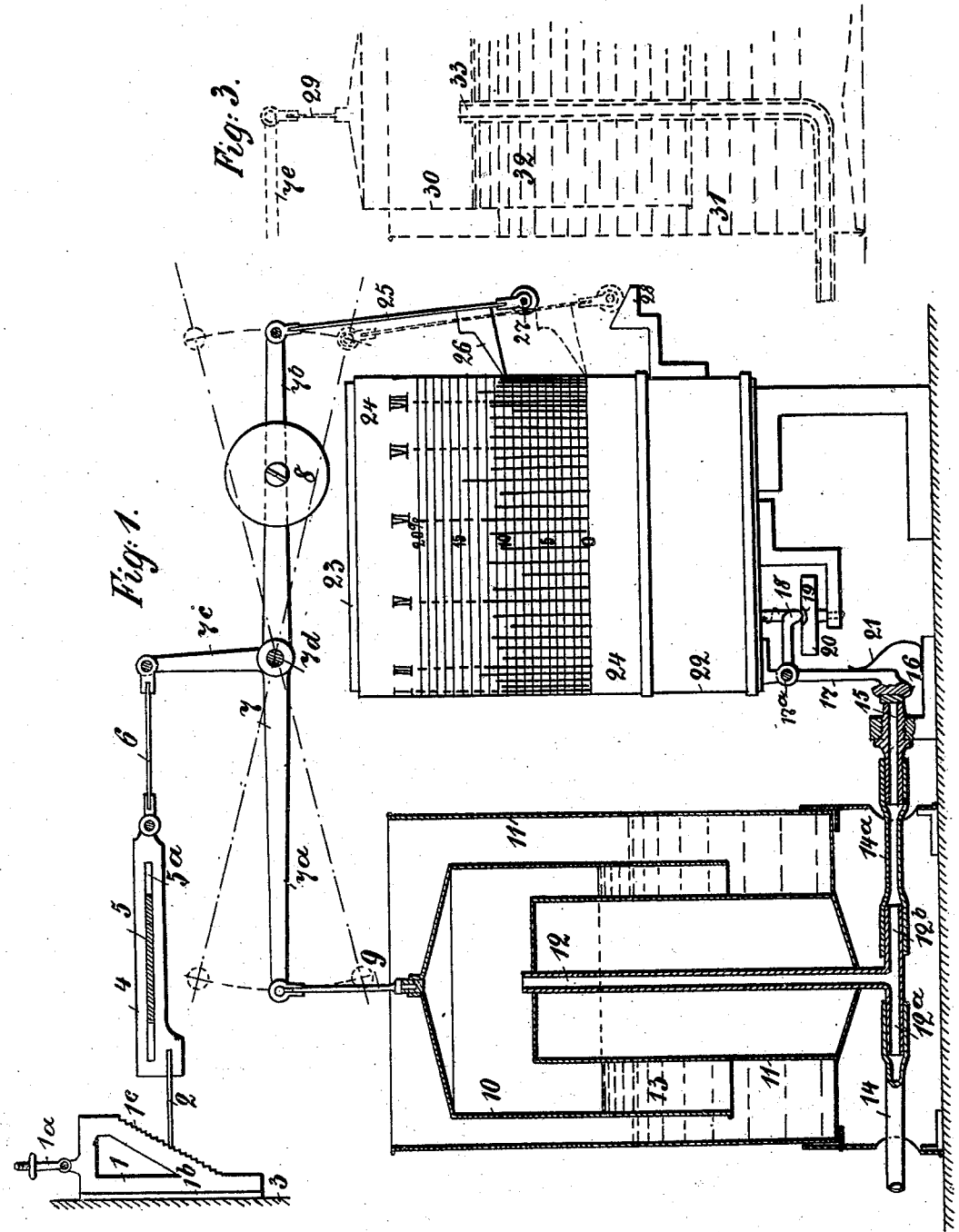

No. 693,990. Patented Feb. 25, 1902.
M. ARNDT.
APPARATUS FOR MEASURING AND RECORDING OSCILLATING MOVEMENTS OF BODIES.
(Application filed Dec. 10, 1898.)
(No Model.) 2 Sheets—Sheet 2.
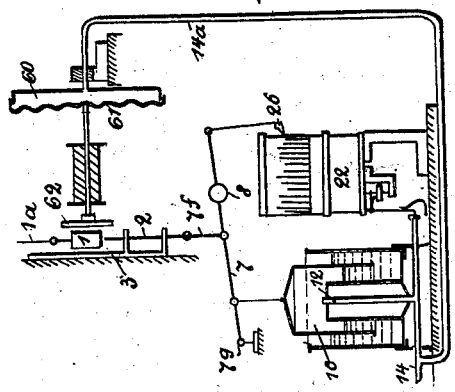
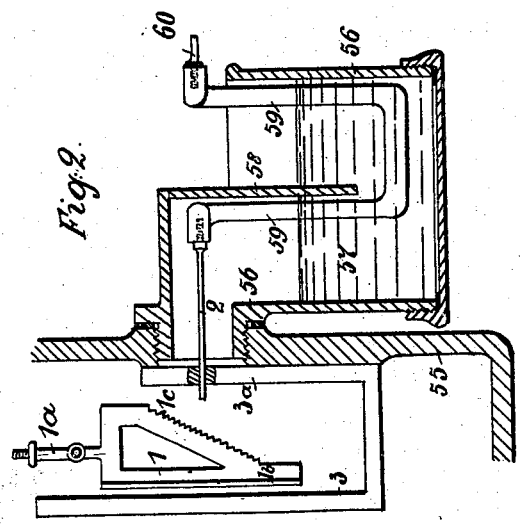
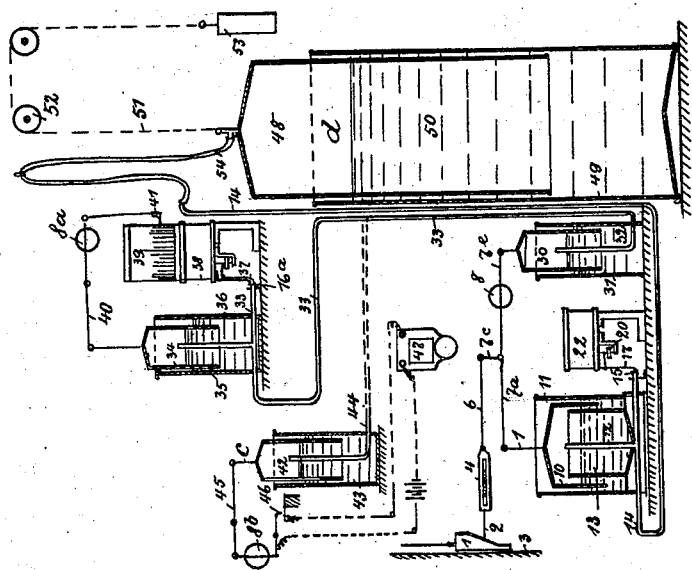

UNITED STATES PATENT OFFICE.

MAX ARNDT, OF AIX-LA-CHAPELLE, GERMANY.

APPARATUS FOR MEASURING AND RECORDING OSCILLATING MOVEMENTS OF BODIES.

SPECIFICATION forming part of Letters Patent No. 693,990, dated February 25, 1902.

Application filed December 10, 1898. Serial No. 698,933. (No model.)

*To all whom it may concern:*

Be it known that I, MAX ARNDT, a subject of the King of Prussia, German Emperor, residing at the city of Aix-la-Chapelle, Germany, have invented a new and useful Apparatus for Measuring and Recording Oscillating or Reciprocating Movements of Bodies, (for which I have filed an application for patent in France on May 12, 1898, and in Germany on May 25, 1898,) of which the following is a specification.

My invention relates to an apparatus for measuring and recording oscillating or reciprocating movements of bodies forming parts of instruments, machines, and the like.

My invention consists of an apparatus which is composed of an air-conduit connected at one end with an exhauster or similar device and provided at the other end with a valve intermittingly closed and opened, the said conduit communicating at the same time with the interior of a movable bell or receptacle locked against the atmosphere and composed of a lever connected to the said bell or receptacle and carrying a pen for recording its strokes on the surface of a uniformly rotating drum, these strokes being controlled by a gage-piece to which is imparted the movement to be recorded.

I have represented my invention in the accompanying drawings, of which—

Figure 1 is a complete view of the apparatus, showing in section the bell or receptacle and the air-conduit, an exhauster or like device being omitted. Fig. 1ª is a similar view, on a reduced scale, of a modification of my invention. Fig. 2 is a sectional view of a part of another modification thereof, and Fig. 3 an enlarged view of a part of the modification of my invention represented in Fig. 4 on a reduced scale.

Referring first to Fig. 1, a conical gage-piece 1 is connected by a rod 1ª to the reciprocating part the movement of which is to be recorded, bearing with its rear face 1ᵇ against a plate 3 and provided with steps 1ᶜ on the opposite side. A finger 2 is provided to a slide-piece 4, guided by a slot 5ª on a guide-plate 5 and connected by a link 6 to lever-arm 7ᶜ of a lever 7, which is pivoted to a stud 7ᵈ, the left-hand arm 7ª of lever 7 being connected by a rod 9 to a floating bell 10 of a gasometer, and the right-hand lever-arm 7ᵇ of lever c carrying by a rod 25 a pen 26 to record the strokes of lever 7 on a writing-surface 24, provided on a rotating drum 23. Floating bell 10 dips into a fluid contained in a vessel 11, and a pipe 12 discharges into floating bell 10. Pipe 12 is provided with lateral extensions 12ª 12ᵇ at its bottom, extension 12ª being connected by a hose 14 to the chamber of an exhauster or the like and extension 12ᵇ by a hose 14ª to a pipe 15, which can be temporarily closed or opened by a valve 16 on a lever 17, pivoted at 17ª and provided with a laterally-projecting bent arm 18 to engage with notches 19 of a rotating cam-disk 20. Lever 17 and cam-disk 20 are supported by suitable frame-pieces carrying a casing 22 for a clockwork, from which a continuously-rotating movement is imparted to the recording-drum 23 and to the cam-disk. Lever 17 is actuated by a spring 21, so as to close by its valve pipe 15 whenever the end of arm 18 engages with a notch of cam-disk 20, but keeping open pipe 15 during the passage of the raised cam portions beneath arm 18. A stop 28 is provided to casing 22 and a roller 27 journaled at the end of rod 25 in order to limit the downward movement and recording action of pen 26.

The operation is as follows: As drum 23 and cam-disk 20 continuously rotate pipe 15 is intermittingly closed by valve 16, while a continuous suction action is exerted by the exhauster or similar device through pipe 14. This results in rarefying the air contained within the floating bell 10 whenever pipe 15 is kept closed and at the same time lowering bell 10 and swinging lever 7 in a direction to bring finger 2 into engagement with a step 1ᶜ of gage-piece 1. In accordance therewith pen 26 will be raised and trace a line on the writing-surface 24 of the drum. The length of this line will obviously correspond to the position of gage-piece 1 occupied at the moment of its being reached by finger 2 in such a manner that the length of the recording-line will increase or decrease in proportion with the more or less elevated position of piece 1 at the moment it is reached by finger 2. During the periods in which pipe 15 is kept open the atmospheric air is allowed to enter through pipe 15 underneath bell 10, which in consequence thereof and by means of the weight 8 on lever-arm $7^b$ is then raised again, finger 2 releasing at the same time gage-piece 1 and allowing the same to assume another position and pen 26 descending until it is stopped by stop 28. By these means during one rotation of drum 23 the corresponding movement of piece 1—i. e., of the part to which it is suspended and the movement of which is to be recorded—will be indicated by lines of different length on the circumference of the writing-surface 24. If, for instance, a slider is connected with the rod $1^a$ and is moved reciprocatingly in the direction of the rod $1^a$, the different positions of the slider are fixed by the entering of the finger 2 in special steps of $1^c$, which responds to the position of the slider. This position is marked on the recording-drum by an irregular line.

In the modification represented in Fig. $1^a$ similar parts are indicated by similar numerals as in Fig. 1. In this modification lever 7 is pivoted at $7^g$ and connected by a link $7^f$ to the finger 2, which is vertically guided and stopped in its upward stroke by gage-piece 1. In lieu of an exhauster an air-compressing device is supposed to be connected to pipe 14, and a branch pipe $14^a$ communicates with a casing 60, closed by a membrane 61. A rod is guided horizontally bearing at one end against the membrane 61 and carrying at the other end a clamping-plate 62, to press piece 1 against resistance-plate 3 and to keep it temporarily in a fixed position by friction. Whenever pipe 14 is kept closed by the controlling-valve, the floating bell will be raised and at the same time by the increasing air-pressure within pipe $14^a$ clamping-plate 62 firmly pressed against piece 1, so as to limit the upward movement of finger 2 and of registering-pen 26. But as the valve opens pipe 14 the pressure decreases within the air-conduit, piece 1 thus being released to assume another position and pen 26 lowered again to its lowermost position.

In Fig. 2 I have represented a modification of Fig. 1 of my invention, in which it may be convenient to provide gage-piece 1 within a casing locked against the atmosphere. In this modification an air-tight casing 55 is provided with a receptacle 56, containing a liquid 57 and a partition 58, dipping under the level of the liquid. Finger 2 is guided in a plate $3^a$, integral with resistance-plate 3 and carried by a U-shaped arm 59, which may be connected at its other end by a pin 60 to slide-piece of similar construction, as slide 4 of Fig. 1.

In Fig. 4 is shown an arrangement in which the gaging device (see letters of reference $a$) may be placed at any distance from the recording device. (See letters of reference $b$.) In Fig. 4 numerals 1 2 3 4 6 7 $7^a$ $7^c$ 8 9 10 11 12 13 14 15 16 17 18 20 22 designate the same parts as in Fig. 1. To the arm $7^c$ of lever $7^a$ floating bell 30 is suspended, dipping into the fluid 32, contained in a vessel 31. (See Fig. 3.) A pipe 33 discharges into bell 30 and communicates by a pipe 36 with the interior of the floating bell 34, (see letters of reference $b$ of Fig. 4,) provided in the liquid-containing vessel 35, pipe 33 being continued at $33^a$ to join with the valve $16^a$ of lever $17^b$, which is actuated, as heretofore described, by a cam-disk $20^a$ underneath a casing 38. The latter contains a clockwork to rotate the cam-disk and the recording-drum 39, placed above the casing. A recording-pen 41 is connected to a lever 40, carrying a weight $8^a$, and at the other end the floating bell 34. In lieu of an exhauster a floating bell 48 is provided, dipping into the liquid 50, contained in a vessel 49, bell 48 being connected by a hose 54 to a pipe 14, which communicates with pipes 12 and 15. (See letters of reference $a$.) Bell 48 is connected to a weight 53 by means of a cord 51, passing on rollers 52, the weight counterbalancing the bell. By lowering the weight 53 bell 48 will be raised and a suction action exerted on floating bell 10, which therefore descends, provided that valve 16 be closed. The said sucking device (see letters of reference $d$ of Fig. 4) may likewise be placed at any distance from the devices $a$ and $b$. As bell 10 descends floating bell 30 will be raised at the same time and slide 4 moved toward the gage-piece 1. By the raising movement of bell 30 the air will be sucked up, and therefore floating bell will be lowered, cam-disk $20^a$ being so timed as to open and close valve $16^a$ together with valve 16. Pen 41 is therefore controlled by piece 1 in the same manner as heretofore described with reference to Fig. 1.

By letters of reference $c$ of Fig. 4 I have indicated an alarm device which may be added in order to signalize at any distance a predetermined position of gage-piece 1. To this purpose a pipe 44 is to be derived from pipe 33, entering a floating bell 42, which dips into the liquid-containing vessel 43. As the pressure in pipe 33 decreases down to a predetermined degree bell 42 will be lowered, and by means of lever 45 and a contact-lever 46, connected thereto, an electric circuit will be closed to ring a bell 47. As the pressure in pipes 33 and 44 increases again levers 45 and 46 will be restored under the influence of weight $8^b$.

It will be obvious that instead of using a suction device for actuating the apparatus compressed air can be made use of, as described with reference to Fig. $1^a$.

What I claim as my invention, and desire to secure by Letters Patent, is—

1. In an apparatus for measuring and recording movements, the combination of a two-branched air-conduit, a bell or receptacle closed against the atmosphere and communicating with one branch of the air-conduit, a valve for temporarily closing and opening the other branch of the air-conduit, means for actuating the valve, a lever connected to the bell or receptacle, a registering-pen connected to the said lever, a rotating drum coacting with the recording-pen, a finger connected to the said lever, and a gage-piece to coact with the finger and to assume the movement to be measured and recorded, substantially as described.

2. In an apparatus for measuring and recording movements, the combination of a two-branched air-conduit, a movable bell or receptacle closed against the atmosphere and communicating with one branch of the air-conduit, a valve for temporarily closing and opening the other branch of the air-conduit, a lever carrying the valve, a revolving cam-disk to control the movement of the lever, a lever connected to the bell or receptacle, a registering-pen connected to the latter lever, a rotating drum coacting with the registering-pen, a finger connected to the pen-actuating lever, and a gage-piece to coact with the said finger and to assume the movement to be measured and recorded, substantially as described.

In testimony that I claim the foregoing as my invention I have signed my name in presence of two subscribing witnesses.

MAX ARNDT.

Witnesses:
FRANK M. BRUNDAGE,
CLARA E. BRUNDAGE.